United States Patent
Bender et al.

(10) Patent No.: US 7,076,264 B2
(45) Date of Patent: Jul. 11, 2006

(54) POWER CONTROL IN A CELLULAR SYSTEM USING $E_S/I_O$ AND $N_T/I_0$ VALUES

(75) Inventors: Paul E. Bender, San Diego, CA (US); Roberto Padovani, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 576 days.

(21) Appl. No.: 10/170,949

(22) Filed: Jun. 12, 2002

(65) Prior Publication Data

US 2002/0151323 A1 Oct. 17, 2002

Related U.S. Application Data

(63) Continuation of application No. 09/359,855, filed on Jul. 22, 1999, now abandoned.

(30) Foreign Application Priority Data

Feb. 19, 1999 (WO) .................... PCT/US99/03683

(51) Int. Cl.
*H04B 7/00* (2006.01)
(52) U.S. Cl. ..................... 455/522; 455/67.11; 455/69; 455/115.1
(58) Field of Classification Search ............ 455/67.11, 455/67.13, 69, 522, 226.1, 226.2, 226.3, 455/296, 420; 370/241, 252, 342, 441, 479, 370/491; 375/200, 227, 296, 346
See application file for complete search history.

(56) References Cited

U.S. PATENT DOCUMENTS

| | | | |
|---|---|---|---|
| 5,440,582 A | 8/1995 | Birchler et al. | |
| 5,559,790 A | 9/1996 | Yano et al. | |
| 5,687,053 A | 11/1997 | Takase et al. | |
| 5,719,898 A * | 2/1998 | Davidovici et al. | 455/69 |
| 5,903,554 A * | 5/1999 | Saints | 370/342 |
| 6,028,894 A * | 2/2000 | Oishi et al. | 375/227 |
| 6,104,933 A * | 8/2000 | Frodigh et al. | 455/522 |
| 6,154,450 A * | 11/2000 | Wallentin et al. | 455/522 |
| 6,269,239 B1 * | 7/2001 | Hashem et al. | 455/69 |

* cited by examiner

*Primary Examiner*—Quochien B. Vuong
(74) *Attorney, Agent, or Firm*—Philip Wadsworth; Sandra L. Godsey; Pavel Kalovsek

(57) ABSTRACT

A system and method is taught for controlling a power level of transmissions in a communication system. A first station of the communication system transmits signals on a communication channel and a pilot channel. A second station of the communication system measures a signal to noise ratio of the received signal, determines an expected signal to noise ratio of the received signal, determines an indicator in accordance with said measured signal to noise ratio and the expected signal to noise ratio, and transmits the indicator. The indicator is received at the first station the indicator and determines the power level of the next transmission according to said received indicator. Additionally, methods and systems for the measurement of the signal to noise ratio of the received signal, the determination of the expected signal to noise ratio of the received signal, and the determination of the indicator are disclosed.

35 Claims, 5 Drawing Sheets

POWER CONTROL IN A CELLULAR SYSTEM USING $E_S/I_O$ AND $N_T/I_0$ VALUES

CROSS REFERENCE

This continuation application claims priority from U.S. application Ser. No. 09/359,855, filed Jul. 22, 1999 now abandoned entitled "Forward Link Power Control in a Cellular System Using $N_T/I_0$ Values" and currently assigned to the assignee of the present application.

BACKGROUND OF THE INVENTION

I. Field of the Invention

The present invention relates to communication systems in general, and to power control in a communication system in particular.

II. Description of the Related Art

There are many in prior art communications systems that require a measurement of the strength of a signal received by a mobile station. For example, during handoff of a mobile station from one base station to another a determination of the strength of the signals received by the mobile station is desirable for determining when to perform the handoff. One such handoff technique is disclosed in U.S. Pat. No. 5,267,261, entitled "MOBILE STATION ASSISTED SOFT HANDOFF IN A CDMA CELLULAR COMMUNICATIONS SYSTEM," assigned to the assignee of the present invention.

In the improved technique of U.S. Pat. No. 5,267,261 the mobile station monitors the signal strength of pilot signals transmitted by neighboring base stations within the system. The mobile station sends a signal strength message to a system controller via the base station through which the mobile station is communicating. Command messages from the system controller to a new base station and to the mobile station in response to the signal strength are thus used to establish communication through the new and current base stations. The mobile station detects when the signal strength of a pilot signal corresponding to at least one of the base stations through which the mobile unit is currently communicating has fallen below a predetermined level. The mobile station reports the measured signal strength indicative of the corresponding base station to the system controller via the base stations through which it is communicating. Command messages from the system controller to the identified base station and mobile station terminate communication through the corresponding base station while communications through the other base station or stations continue.

It is known for the power control information transmitted from the mobile station to be inserted into a dedicated control channel separate from the traffic channel. However, it is desirable to decrease the need for separate control channels. Additionally, while it is preferable for the power of the energy of the signal sent on the traffic channel to be used to determine the power control parameters, it is known, for the control information to be based upon the error rate rather than the signal-to-noise ratio because the signal-to-noise ratio of the traffic channel is difficult to measure. For example, in some current systems, the time between errors is used to indicate the error rate. The error rate is then used to determine the quality of the traffic channel. Furthermore, it is difficult to obtain power control information and utilize it in time to respond to the conditions indicated in the power control information.

SUMMARY OF THE INVENTION

A system and method is taught for estimating the relative amount of power that is provided on the traffic channel using a calculated amount of noise that is present on a pilot channel. This estimate may then be used for several purposes, including controlling the power level of transmissions within a communication system having a base station, a mobile station and a plurality of channels including a communication channel and a pilot channel. The mobile station measures the ratio of the amount of energy received per symbol to the amount of interference received. The amount of energy received over the pilot channel is used to determine the amount of noise received in the pilot channel. The signal-to-noise ratio of the communication signal is determined according to the determined signal strength value and the pilot channel noise value. Accordingly, in one embodiment of the disclosed method and apparatus, the power level of a transmission is controlled according to the calculated signal-to-noise ratio.

A system and method is also taught for estimating the noise level in a communication channel within the communication system. The pilot signal includes a pilot energy component and a pilot noise component. The pilot energy component is removed from the pilot channel signal to provide a remaining pilot signal. As noted above, the amount of noise in the channel is estimated based upon the amount of noise in the pilot channel.

As noted above, in accordance with systems, the power of transmitted signals is controlled based upon an indication of the amount of power received by the intended receiving device. In such systems, the power levels of transmissions are controlled by determining difference between the signal-to-noise ratio of a received signal and the desired signal-to-noise ratio. A transmitter transmits the difference signal between the base station and the mobile station.

The pilot channel is divided in time into frames and the power control signal is inserted into each frame. Thus, information representative of the strength of the communication signal is transmitted to the base station by way of the pilot channel within each frame.

BRIEF DESCRIPTION OF THE DRAWINGS

The features, objects, and advantages of the present invention will become more apparent from the detailed description set forth below in conjunction with the drawings in which like reference characters identify correspondingly throughout and wherein.

DESCRIPTION OF THE PREFERRED EMBODIMENTS

Figure 1:
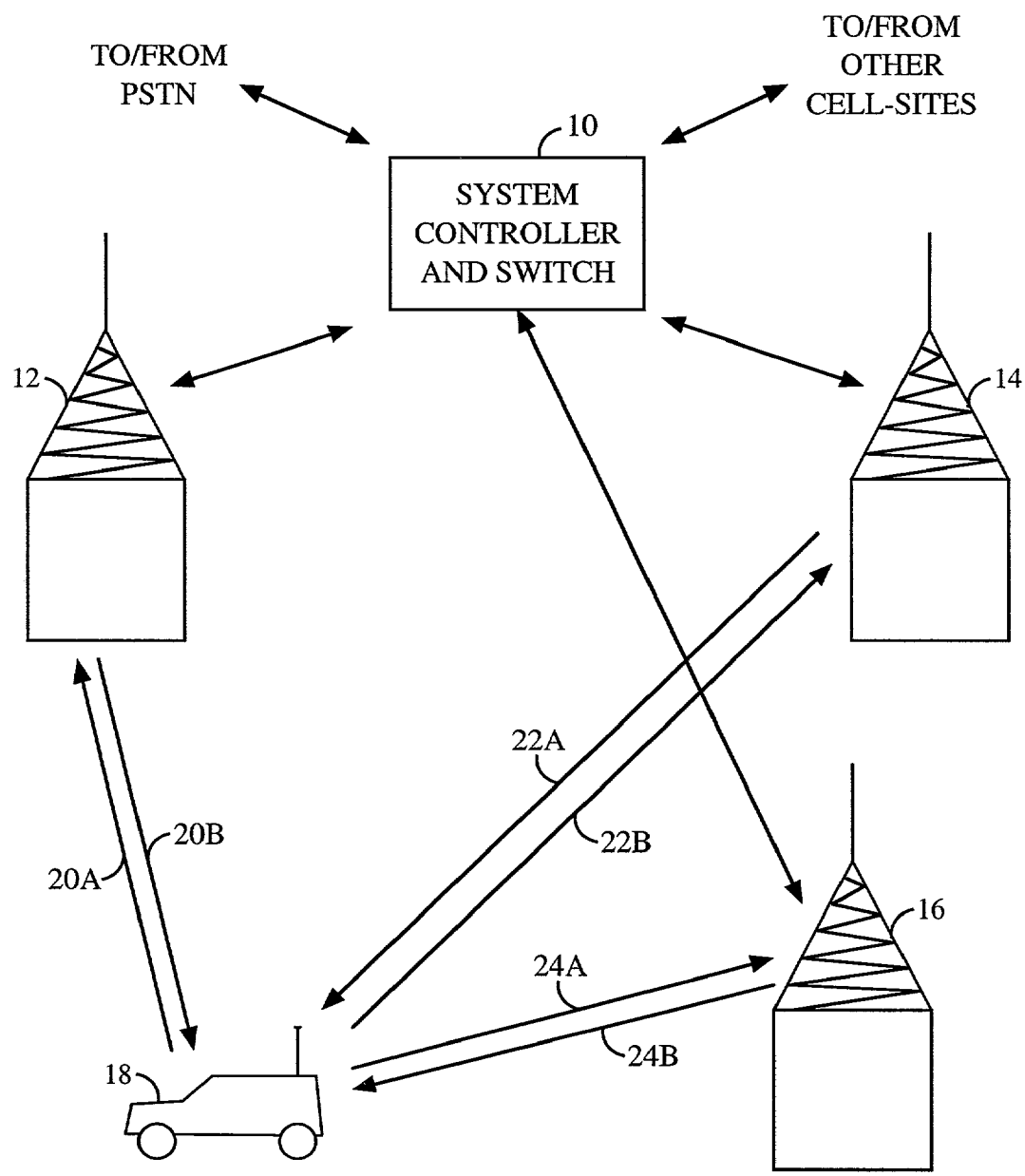
FIG. 1 shows an exemplary illustration of a cellular communication system.

An exemplary illustration of a cellular communication system is provided in FIG. 1. The system illustrated in FIG. 1 can use various multiple access modulation techniques for facilitating communications between a large number of system mobile stations (or mobile communication devices), and the base stations. These techniques include CDMA spread spectrum modulation.

In a typical CDMA system, the base stations transmit a unique pilot signal, including a pilot carrier, upon a corresponding pilot channel. For example, in accordance with one embodiment of the disclosed method and apparatus, the pilot signal is an unmodulated, direct sequence, spread spectrum signal transmitted at all times by each base station using a common pseudorandom noise (PN) spreading code. The pilot signal allows the mobile stations to obtain initial system synchronization in addition to providing a phase reference for coherent demodulation and a reference for signal strength measurements. Furthermore, the received pilot signal can be used to estimate the arrival time, phase, and amplitude of the received traffic signal. In accordance with one embodiment of the disclosed method and apparatus, the pilot signal transmitted by each base station is modulated with the same PN spreading code with different code phase offsets.

A system controller 10, also referred to as a mobile switching center (MSC) 10, typically includes interface and processing circuitry for providing system control to the base stations. The controller 10 also controls the routing of communication device calls from the networks (such as the public switched telephone network (PSTN)) to the appropriate base station for transmission to the appropriate mobile station. The routing of calls from mobile stations through base stations to the PSTN is also controlled by the controller 10.

The controller 10 can be coupled to the base stations 12, 14, 16 by various means such as dedicated phone lines, optical fiber links or by microwave communication links. In FIG. 1, three base stations 12, 14, 16 and a communication device (such as a mobile station) 18 are illustrated. The mobile station 18 consists of at least a receiver, a transmitter, and a processor. The base stations 12, 14, 16 typically include processing circuitry for controlling the functions of the base stations 12, 14, 16, and interface circuitry for communicating with both the mobile station 18 and the system controller 10.

The arrows 20A–20B shown in FIG. 1 represent the possible communication link between the base station 12 and the mobile station 18. The arrows 22A–22B shown in FIG. 1 represent the possible communication link between the base station 14 and the mobile station 18. Similarly, the arrows 24A–24B shown in FIG. 1 represent the possible communication link between the base station 16 and the mobile station 18.

After a mobile station 18 processes a received signal, the resulting signal is a composite of a desired signal and a noise signal. The signal-to-noise ratio averaged over some period of time is a good measure of the strength of the received signal. For example, in a CDMA system the signal-to-noise ratio of the received signal can be averaged over a block. The mobile station 18 can therefore estimate the signal-to-noise ratio and compare the estimate with the value the mobile station 18 actually received. In accordance with one embodiment of the disclosed method and apparatus, the mobile station 18 sends to the base stations 12, 14, 16 the resulting difference between the measured and expected values of the signal-to-noise ratio as a parameter (FWD_SNR_DELTA) represented in units of decibels. The parameter (FWD_SNR_DELTA) is preferably transmitted on a reverse link power control subchannel.

In determining the expected signal-to-noise ratio, the mobile station 18 calculates a signal-to-noise ratio that will result in an average forward link fundamental block erasure rate equal to the forward link fundamental block erasure rate configured by the base stations 12, 14, 16. In calculating the expected signal-to-noise ratio, the mobile station 18 assumes that successively lower rate blocks are transmitted with three decibels less power per PN chip. In accordance with one embodiment of the disclosed apparatus, the mobile station 18 performs maximal ratio combining of the receive paths.

Figure 3:
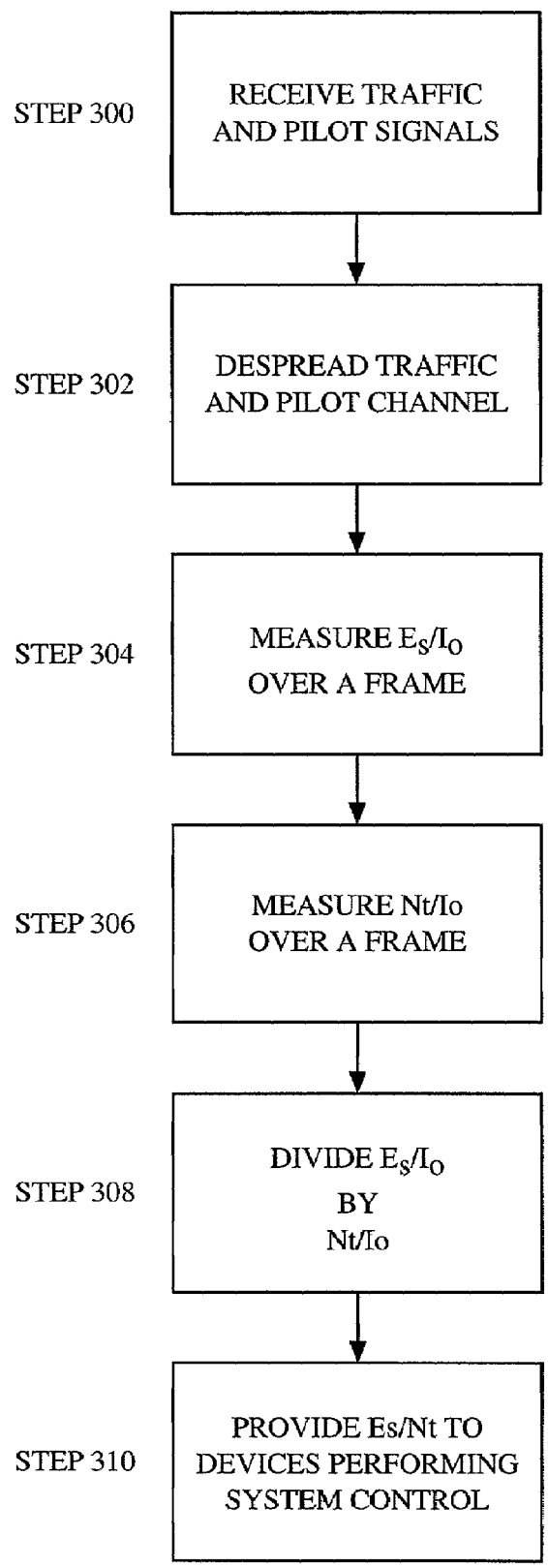
FIG. 3 is a flow chart illustrating the steps performed to determine signal-to-noise ratio of a received traffic signal.
Figure 4:
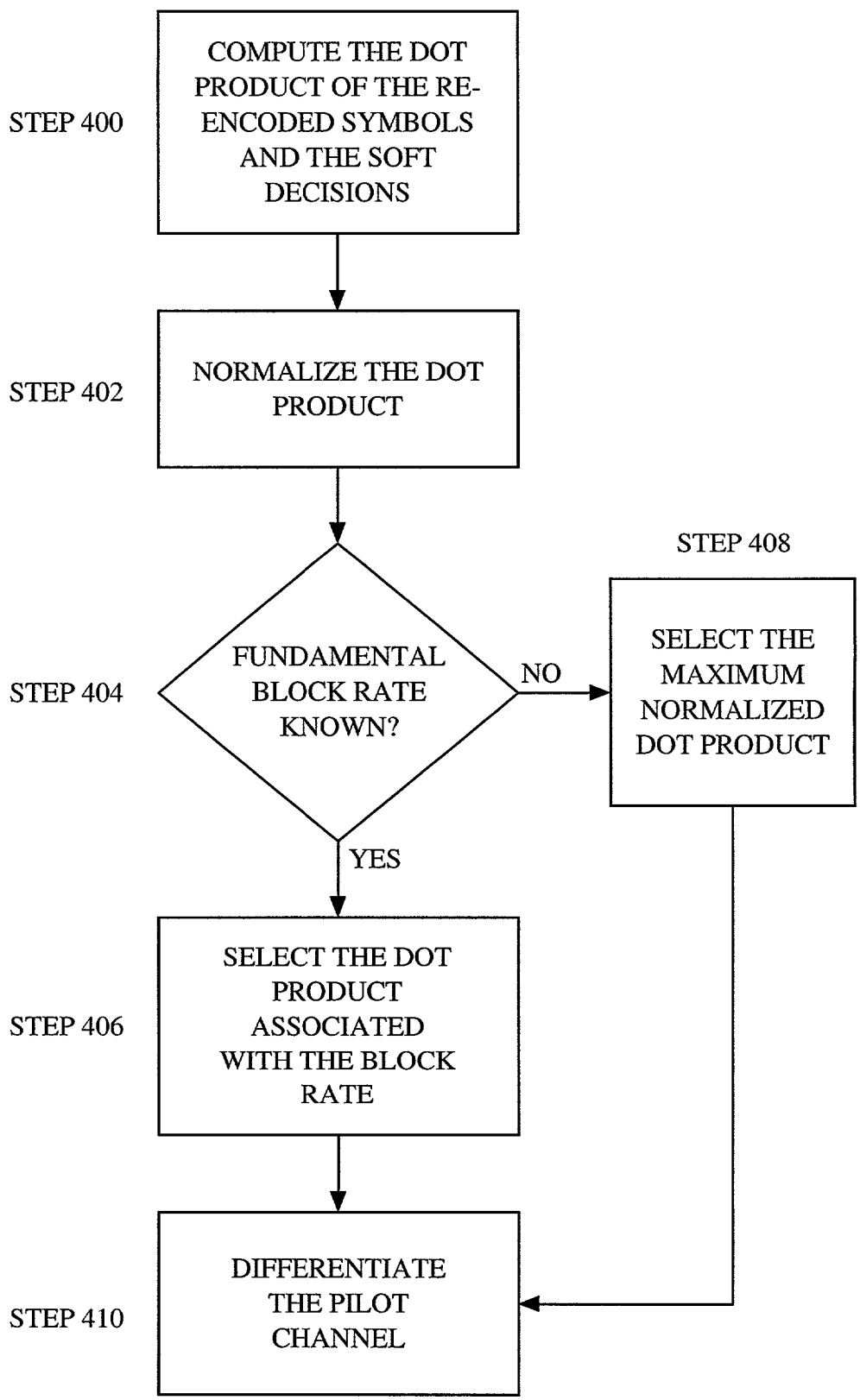
FIG. 4 is a detailed flow chart illustrating certain steps of FIG. 3.

In addition to calculating the expected signal-to-noise ratio, the mobile station 18 must determine the signal-to-noise ratio of the received traffic signal. The flowchart of FIG. 3 is a high level flowchart that illustrates the steps that are performed in order to determine the signal-to-noise ratio of the received traffic signal. Initially, the traffic and pilot signals are received together with any noise on the channel (STEP 300). While filters remove noise that is out of the frequency band over which the traffic and pilot signals are transmitted, noise that is in-band, is passed. The received traffic signal is decovered by the particular Walsh code used to channelize the traffic channel. Likewise, the pilot channel is decovered by the particular Walsh code used to channelize the pilot channel (STEP 302). Once the pilot and traffic channels have been decovered, the per symbol signal to interference $E_S/I_o$ is measured (STEP 304). Next, the noise to interference, $N_t/I_o$ is measured (STEP 306). Once these values are measured, the per symbol signal-to-interference, $E_S/N_t$ is divided by the $N_t/I_o$ to yield the per symbol signal-to-noise ratio, $E_S/N_t$ (STEP 308). This value is then provided to devices that use the per symbol signal-to-noise ratio $E_S/N_t$ to control the system (STEP 310), such as by performing power control of the forward link transmit signal. The details as to how STEPs 304 and 306 are performed are provided in the flowchart in FIG. 4.

It should be understood by those skilled in the art that prior to decovering to separate the orthogonal channels, each of the traffic channels is included in the noise on the pilot channel. Likewise, the pilot signal and each of the traffic channels, except the traffic channel of interest, are included in the noise of the traffic channel of interest. Once decovered, the noise in the traffic channel includes only energy associated with non-orthogonal signals. It should further be understood by those skilled in the art that an automatic gain control device is typically used to ensure that the total received signal is received at an essentially constant value. Accordingly, all of the signal values are referenced to the total received signal strength, $I_o$. Nonetheless, this is not noted in the equations that follow. Accordingly, the total received traffic signal can be represented as:

$$r_T = s_T + n_T \qquad \text{EQN. (1)}$$

where $s_T$ represents the desired traffic signal and $n_T$ represents the noise in the received traffic signal. It will be understood that:

$$s_T = \Sigma d_k E_{s,k}^{1/2} \qquad \text{EQN. (2)}$$

where $d_k$ is the $k^{th}$ symbol within the symbol stream or data stream of the traffic channel; and $E_{S,k}$ is the total received energy of the traffic channel over the $k^{th}$ symbol. The sum is taken for all k from 1 to n, where n is the total number of symbols in a frame. It should be noted that in an alternative embodiment of the disclosed method and apparatus, the number of symbols, n may differ from the number of symbols in a frame.

In many cases, a "rake" receiver is used to combine signals received from different sources or signals from the same source that have traversed different paths (and thus are delayed with respect to one another). In such cases, the total received traffic signal is attained by multiplying the traffic signals received on each independent path by the associated pilot signals. This multiplication results in each received traffic signal being weighted by the relative strength of the associated pilot signal. These products are then summed to form the total received traffic signal $r_T$. The following equation represents this sum:

$$r_T = \Sigma r_{T,i} \langle r_{P,i} \rangle \qquad \text{EQN. (3)}$$

where the sum is taken over the subscript i from 1 to m, $r_{T,i}$ is the received traffic signal for the $i^{th}$ path, m is the total number of paths, and the brackets which enclose the term $r_{P,i}$ indicate the fact that the pilot signal may be filtered by a low pass filter to reduce any fluctuations in the amplitude of the pilot over short periods in time.

The total received pilot signal for a particular path can be represented as:

$$r_{P,i} = s_{P,i} + n_{P,i} \qquad \text{EQN. (4)}$$

where $s_P$ represents the received pilot signal and $n_P$ represents the pilot noise.

In addition, the pilot signal value $s_{P,i}$ is equal to the data times the square root of the energy per symbol, $E_s$ and a scaling factor. This relationship can be represented as follows:

$$s_{P,i} = \alpha \Sigma(d_k E_{s,k}^{1/2}) \qquad \text{EQN. (5)}$$

where: $\alpha$ is a scaling factor which takes into account the relative transmission gains of the traffic and pilot channels and the integration lengths for each channel; the sum is taken over the subscript k from 1 to n; n is the total number of symbols; $d_k$ is the $k^{th}$ symbol of the symbol stream or data stream of the pilot channel; and $E_{S,k}$ is the total received energy of the pilot channel over the $k^{th}$ symbol. The symbol stream d is essentially either a positive one or a negative one representing the state of the information modulated on the pilot channel. In the case of the pilot signal, it is typical for the data to have a constant value of one. Therefore, the data, d can be dropped from the equation. In multiplying a traffic signal with a pilot signal, Eqn. (2) can be substituted into Eqn. (1), and Eqn. (5) can be substituted into Eqn. (4). The resulting product is then:

$$r_T = [(\Sigma d_k E_{S,k}^{1/2})_i + n_{T,i}] \cdot [\alpha \Sigma(d_k E_{S,k}^{1/2})_i + n_{P,i}] = d\alpha E_S + \text{noise} \qquad \text{EQN. (6)}$$

However, if the noise $n_P$ of the pilot signal $r_P$ and the noise $n_T$ of the traffic signal $r_T$ are uncorrelated, then the product $r_T$ is essentially a scaled unbiased estimator of the traffic data multiplied by the traffic signal energy. This is due to the fact that the uncorrelated noise will not sum up. However, the correlated data does sum up. Accordingly, an assumption can be made that the noise is negligible (i.e., insignificant and can be ignored). It can reasonably be assumed that the noise $n_P$ of the pilot signal $r_P$ and the noise $n_T$ of the traffic signal $r_T$ are uncorrelated, because the pilot signal $r_P$ and the traffic signal $r_T$ are transmitted on orthogonal channels.

Since d is essentially random and unknown, it is desirable to eliminate d from Eqn. (6). In accordance with the disclosed method and apparatus, in order to eliminate d from Eqn. (6), a dot product is performed. The dot product is taken between the estimator $d\alpha E_T$ and the symbol stream d after decoding and re-encoding of the received traffic signal (STEP 400). By decoding the traffic information, the information is essentially extracted from the received signal. Re-encoding the information returns the information to the state in which it existed before the decoding. Since the data sequence is relatively well known after the decoding operation, performing this dot product allows the data sequence to be taken into account when determining the energy of the received signal. That is, the dot product projects the data onto the received signal. Accordingly, the energy in the information symbols is summed and the energy in the noise is not since the noise is uncorrelated. Naturally, the more symbols that are summed, the greater the ratio of symbol energy to noise. The result of the dot product operation is:

$$\alpha E_T \cdot \alpha E_T = (\alpha E_T)^2 \qquad \text{EQN. (7)}$$

In order to estimate the traffic channel signal energy, the scaling factor $\alpha$ is removed from Eqn. (7). Scaling factor $\alpha$ can be represented as:

$$\alpha = G_P/G_T \cdot L_P/L_T \qquad \text{EQN. (8)}$$

where $G_P$ is the pilot signal transmission gain, $G_T$ is the traffic transmit signal transmission gain, $L_P$ is the integration period of the pilot signal, and $L_T$ is the integration period of the traffic signal. While the pilot integration period $L_P$ and the traffic integration period $L_T$ are known, the relationship between the pilot signal gain $G_P$ and the traffic transmit signal gain $G_T$ is typically not known in cases in which power control factors change the gain of the traffic channel.

Therefore, in order to eliminate the scaling factor $\alpha$, the mobile station 18 determines the pilot energy by computing the dot product of the pilot signal with itself. This produces a biased estimate of the pilot energy $E_P$ which is a scaled biased estimate of the traffic channel signal energy, $E_P = \alpha^2 E_T$. Therefore, a biased estimate of the traffic channel signal energy $E_T$ can be determined by squaring the unbiased estimator, $\alpha E_T$ of the traffic signal energy and dividing it by the biased estimator of the pilot signal energy $E_P$:

$$E_T = (\alpha E_T)^2/(\alpha^2 E_T) \qquad \text{EQN. (9)}$$

As noted above in Eqn. (7), the energy per symbol, $E_S$ can then be attained by normalizing the value $E_T$ with respect to a symbol (i.e., by dividing by the number of symbols over which $E_T$ was determined, such as the number of symbols per frame) (STEP 402). Accordingly:

$$E_T/n = E_S \qquad \text{EQN. (10)}$$

where n is the number of symbols over which $E_T$ was determined.

If the fundamental block rate of the received traffic signal is known (STEP 404), then the normalized dot product associated with the block rate is selected (STEP 406). However, if the fundamental block rate is not known (STEP 404), then the dot product that has the maximum value is selected (STEP 408).

The disclosed method and apparatus takes advantage of the fact that the pilot signal has a known constant data sequence. Since the data sequence is known, the pilot channel signal can be easily differentiated to isolate the noise content (STEP 410). In accordance with one embodiment of the disclosed method and apparatus, this is done by inverting the pilot channel, shifting the inverted pilot channel signal one symbol in time with respect to the unshifted pilot channel signal, and summing the shifted inverted pilot channel signal with the unshifted pilot channel signal. This can also be done by decovering the pilot channel with Walsh code $W_{64}^{128}$ and integrating over the frame. This particular Walsh code is a pattern of alternating positive ones and negative ones. Thus, the sum of the energy in the pilot channel over a discrete number of symbols is zero, thereby isolating the remaining $N_T$ term. This permits a determination of the normalized noise of the pilot channel.

The desired value, which is the signal-to-noise ratio is $E_S/N_T$, can be attained by simply dividing the value $E_S$ by the value $N_T$.

Figure 5:
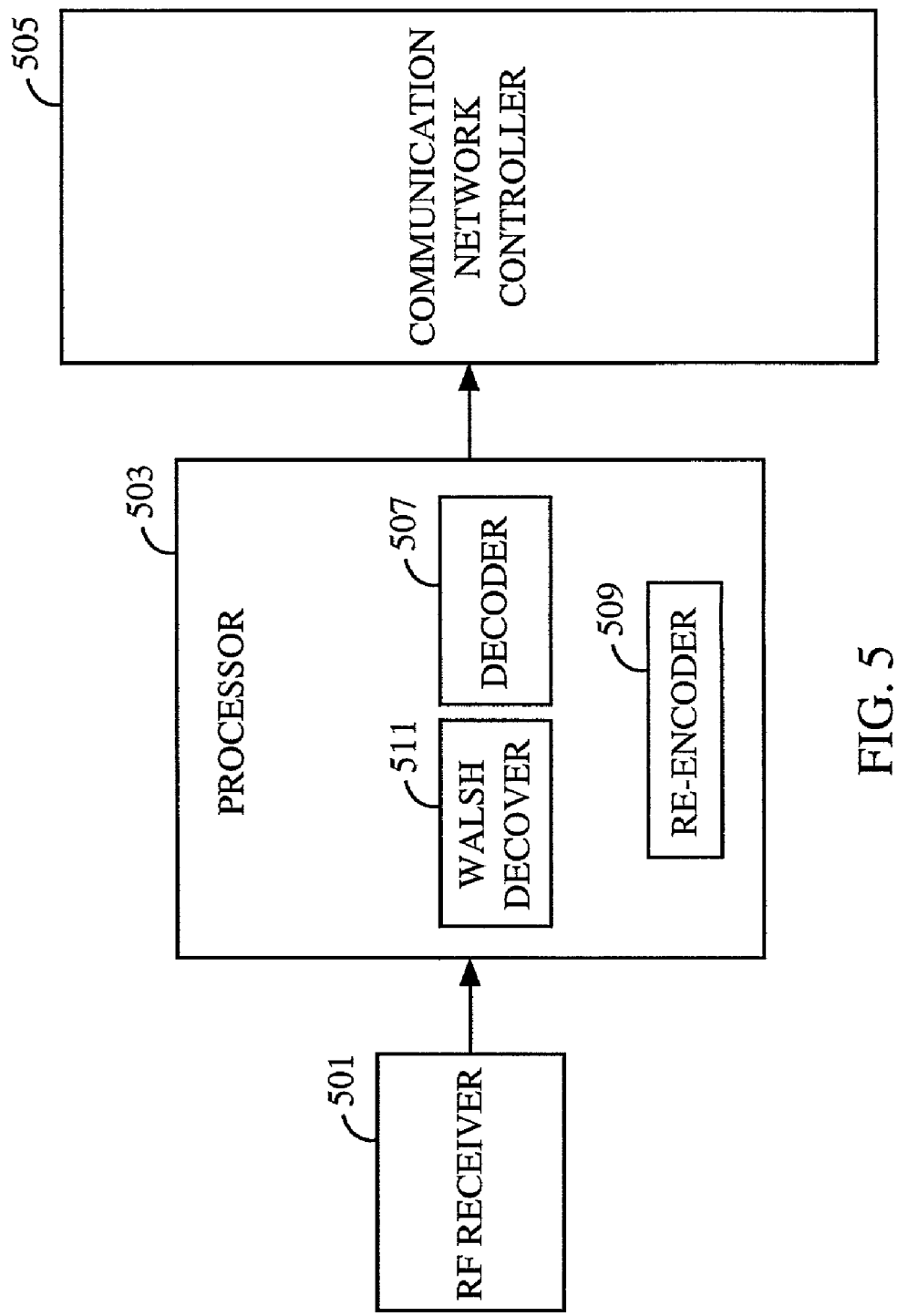
FIG. 5 is a block diagram of the disclosed apparatus.

FIG. 5 is a simplified block diagram of the disclosed apparatus. A radio frequency (RF) receiver 501 receives the incoming signal and does RF processing in known fashion. The received signal is then coupled to a processor 503. A Walsh decovering circuit 511 within the processor 503 decovers each of the traffic channels and the pilot channel. It will be understood by those skilled in the art that the Walsh decovering circuit 511 may be implemented either as software run on the processor 511, as a circuit which is implemented using discrete components, an application specific integrated circuit (ASIC) which is distinct from the processor 511, or in any other manner that would allow the decovering procedure to be accomplished, as is well known in the art. Once decovered, the traffic channel signal is coupled to a decoder 507. Similar to the decovering circuit, the decoder 507 may be implemented using discrete components, an application specific integrated circuit (ASIC) which is distinct from the processor 511, or in any other manner that would allow the decoding procedure to be accomplished, as is well known in the art. The decoding process results in the information that was originally encoded by the transmitter that transmitted the received signal. This information is then coupled to a re-encoder 509. The re-encoder 509 may be implemented using discrete components, an application specific integrated circuit (ASIC) which is distinct from the processor 511, or in any other manner that would allow the re-encoding procedure to be accomplished, as is well known in the art. Once the re-encoding function has been performed, the processor 503 performs the functions described above to determine the $E_S/N_T$ value. This value is then coupled to a communication network controller 505, such as the processor within a base station that is responsible for controlling the forward link power control, or the processor within a mobile cellular telephone that is responsible for communicating the amount the forward link power control should be adjusted in order to maintain a desired transmission power. It should be noted that the particular use to be made of the $E_S/N_T$ value is not intended to be limited by the particular embodiments that are disclosed herein, but should be understood to include all possible applications of this quality value.

The mobile station 18 can also calculate the measured normalized signal-to-noise ratio, $E_f/N_t$, on a per frame basis. The normalized per frame signal-to-interference ratio $E_f/R$ is measured, where R is the total signal received and $E_f$ is the energy of the desired signal during a single frame. The per frame noise-to-interference ratio, $N_t/R$, is then measured. $E_f/I_0$ is then divided by $N_t/R$ in order to calculate $E_f/N_t$.

The normalized per frame signal-to-noise ratio, $E_f/N_0$ used to calculate the normalized per frame signal can be calculated as follows: the dot product of the re-encoded symbols d and the soft decisions $d\alpha E_T/I_0$ can be computed for each rate of the fundamental block. The result can be squared and divided by the estimated pilot energy as shown:

$$E_P/I_0 = \alpha^2 E_T/I_0 \qquad \text{EQN. (11)}$$

The dot products for each rate of the fundamental block can be normalized using the ratio of the number of symbols in a full rate block to the number of symbols in the block. If the fundamental block rate is not known the maximum normalized dot product can be selected. The per frame noise-to-interference ratio, $N_t/I_0$ can then be measured by accumulating the energy in a forward code channel over the frame.

Signals representative of the signal-to-noise ratio can be used for the control of power transmission levels in the system and method of the present invention. In the preferred embodiment of the invention for example, the base stations 12, 14, 16 can use the FWD_SNR_DELTA value sent to it by the mobile station 18. The FWD_SNR_DELTA value is sent to the base stations by the mobile station 18 on the power control subchannel of a reverse frame n to adjust the forward gain (FWD_GAIN) it applies to a forward frame n+1.

In order to calculate FWD_SNR_DELTA, the mobile station 18 can use an expected signal-to-noise value along with the calculated signal-to-noise value. The per frame expected signal-to-noise ratio $E_f/N_t$ can be calculated as follows. The mobile station 18 can set the initial expected value equal to the signal-to-noise ratio of the first fundamental block that it successfully decodes. If the fundamental block is erased the mobile station 18 increases the expected value of $E_f/N_t$. Otherwise, the mobile station 18 decreases the expected value of $E_f/N_t$.

The increase step size $P_i$ and the decrease step size $P_d$ are determined by the desired forward link fundamental block erasure rate $R_e$ and the maximum rate of increase of $E_f/N_t$. This maximum rate of increase can be defined as $P_m$. Then, $P_d=(R_e P_m)/(R_e-1)$ and $P_i=(P_d/R_e)$. $P_m$ can have a value of one-half.

If the power control subchannel FWD_SNR_DELTA is not erased by the base stations 12, 14, 16, the forward per symbol signal-to-noise ratio delta flag (FWD_SNR_VALID) is set to 1. Otherwise, the base stations 12, 14, 16 set both the FWD_SNR_DELTA and FWD_SNR_VALID values to 0. The forward gain applied by the base station transmitter to forward transmit frame n+1 is then calculated as follows:

FWD_GAIN[n+1]=FWD_GAIN_MIN, where
FWD_GAIN$_{adj}$<FWD_GAIN_MIN |FWD_
GAIN_MAX, where
FWD_GAIN$_{adj}$>FWD_GAIN_MAX |FWD_
GAIN$_{adj}$, otherwise     EQN. (12)

where FWD_GAIN$_{adj}$=FWD_GAIN[N]*10$^{-X}$, and superscript X is determined according to FWD_SNR_DELTA and FWD_SNR_VALID. It will be understood, however, that any method of calculating FWD_GAIN can be used in accordance with the system and method of the present invention.

Figure 2:
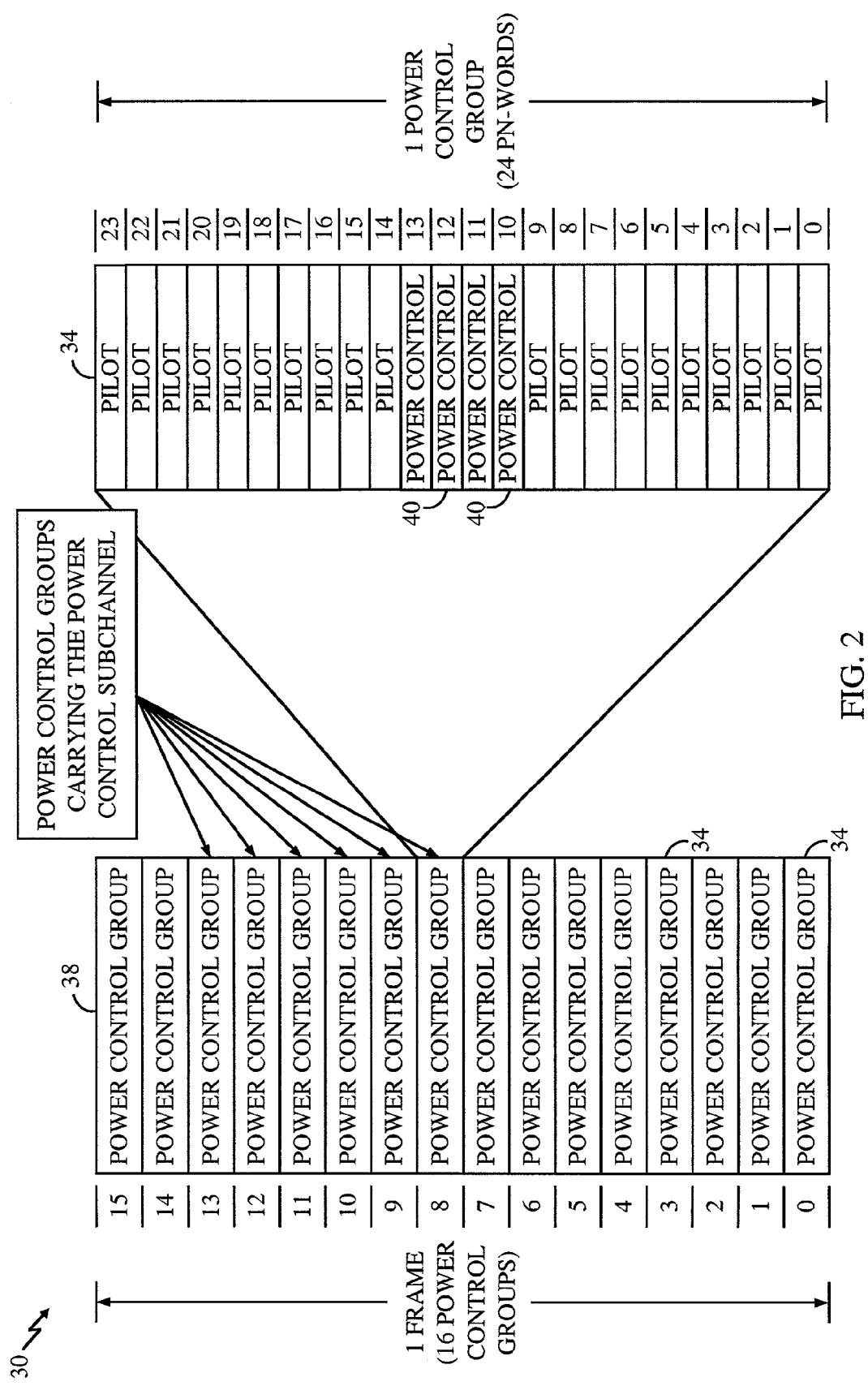
FIG. 2 shows a power control subchannel within the cellular communication system of FIG. 1.

Referring now to FIG. 2, there is shown a portion of power control subchannel 30. Power control subchannel 30 is suitable for use in the communication system of FIG. 1. For example, power control subchannel 30 can be used to transmit FWD_SNR_DELTA from the mobile station 18 to the base stations 12, 14, 16 in order to control the power level of transmissions to the mobile station 18.

Power control subchannel 30 can be located within a pilot channel carrying a plurality of power control groups 34. For example, sixteen power control groups 34 can form each of a plurality of frames 38 within the pilot channel. Each power control group 34 can contain a plurality of pseudorandom noise words 38. In practicing the method of the present invention one or more pseudorandom noise words 38 can be removed and replaced with power control information 40.

The removed pseudorandom noise words 38 can be any noise words 34 within the length of power control group 34. However, in a preferred embodiment, noise words 38 located towards the center of power control group 34 are used. It is preferred that power control information 40 instruct a transmitter to increase or decrease the transmit power level a specified amount or to leave the transmit power level unchanged, as shown in Eqn. (12). Furthermore, it is also preferred that the transmission of frame 38 containing power control information 40 in this manner be repeated several times in order to increase reliability.

It will be understood that any power control information can be transmitted by puncturing the power control information into selected positions within a power control group 34. In addition, it will be understood that this method of puncturing power control information into the pilot channel may be advantageously applied to any of the methods for determining power control information set forth herein.

The foregoing description of the preferred embodiments of this invention is provided to enable a person of ordinary skill in the art to make and use the invention claimed herein. Various modifications to these embodiments will be readily apparent to those skilled in the art, and the principles described can be applied to other embodiments without the use of any inventive faculty. Therefore, the present invention is not to be limited to the specific embodiments disclosed but is to be accorded the widest scope consistent with the principles and novel features disclosed herein.

What is claimed is:

1. A method for controlling a power level of transmissions from a first station in a communication system comprising:
   receiving, at the first station, an indicator relating a measured signal to noise ratio to an expected signal to noise ratio of a previous transmission;
   determining the power level of the next transmission according to said received indicator;
   measuring, at a second station, a signal to noise ratio of a transmission from the first station;
   determining, at the second station, an expected signal to noise ratio of the transmission;
   determining the indicator in accordance with said measured signal to noise ratio and the expected signal to noise ratio; and
   transmitting, from the second station, the indicator, wherein said measuring at a second station a signal to noise ratio comprises:
   measuring a signal to interference ratio over a first predetermined amount of time;
   measuring a noise to interference ratio over a second predetermined amount of time; and
   dividing the measured signal to interference ratio by the measured noise to interference ratio.

2. A method for controlling a power level of transmissions from a first station in a communication system comprising:
   receiving, at the first station, an indicator relating a measured signal to noise ratio to an expected signal to noise ratio of a previous transmission;
   determining the power level of the next transmission according to said received indicator;
   measuring, at a second station, a signal to noise ratio of a transmission from the first station;
   determining, at the second station, an expected signal to noise ratio of the transmission;
   determining the indicator in accordance with said measured signal to noise ratio and the expected signal to noise ratio; and
   transmitting, from the second station, the indicator, wherein said determining at the second station, an expected signal to noise ratio comprises:
   decoding the transmission, wherein said transmission comprises an initial expected value equal to a signal to noise ratio of a first fundamental block decoded by said first station; and
   decreasing a previously determined expected signal to noise ratio by a first value when said decoding is successful.

3. The method as claimed in claim 2, further comprising:
   increasing the previously determined expected signal to noise ratio by a first value when said decoding is unsuccessful.

4. A method for controlling a power level of transmissions from a first station in a communication system comprising:
   receiving, at the first station, an indicator relating a measured signal to noise ratio to an expected signal to noise ratio of a previous transmission;
   determining the power level of the next transmission according to said received indicator;
   measuring, at a second station, a signal to noise ratio of a transmission from the first station;
   determining, at the second station, an expected signal to noise ratio of the transmission;
   determining the indicator in accordance with said measured signal to noise ratio and the expected signal to noise ratio;
   transmitting, from the second station, the indicator; and
   setting an initial expected signal to noise ratio equal to the signal to noise ratio of a first successfully decoded transmission.

5. An apparatus for controlling a power level of transmissions from a first station in a communication system comprising:
   a receiver configured to receive, at the first station, an indicator relating a measured signal to noise ratio to an expected signal to noise ratio of a previous transmission;
   means for determining the power level of a transmission of the link according to said received indicator;
   means for measuring, at a second station, a signal to noise ratio of a transmission from the first station;
   means for determining, at the second station, an expected signal to noise ratio of the transmission;
   means for determining the indicator in accordance with said measured signal to noise ratio and said expected signal to noise ratio; and
   a transmitter configured to transmit, from the second station, the indicator, wherein said means for measuring, at a second station, a signal to noise ratio of a transmission comprises:
   means for measuring a signal to interference ratio of the transmission over a first time interval;
   means for measuring a noise to interference ratio over a second time interval; and
   means for dividing the measured signal to interference ratio by the measured noise to interference ratio.

6. An apparatus for controlling a power level of transmissions from a first station in a communication system comprising:
   a receiver configured to receive, at the first station, an indicator relating a measured signal to noise ratio to an expected signal to noise ratio of a previous transmission;
   means for determining the power level of a transmission of the link according to said received indicator;
   means for measuring, at a second station, a signal to noise ratio of a transmission from the first station;

means for determining, at the second station, an expected signal to noise ratio of the transmission;

means for determining the indicator in accordance with said measured signal to noise ratio and the expected signal to noise ratio; and a transmitter configured to transmit, from the second station, the indicator, wherein said means for determining, at the second station, an expected signal to noise ratio comprises:

a decoder configured to decode the transmission, wherein said transmission comprises an initial expected value equal to a signal to noise ratio of a first fundamental block decoded by said first station; and means for decreasing a previously determined expected signal to noise ratio by a first value when said decoder decoded the transmission successfully.

7. The apparatus as claimed in claim 6, further comprising:

means for increasing the previously determined expected signal to noise ratio by a first value when said decoder failed to decode the transmission.

8. An apparatus for controlling a power level of transmissions from a first station in a communication system comprising:

a receiver configured to receive, at the first station, an indicator relating a measured signal to noise ratio to an expected signal to noise ratio of a previous transmission;

means for determining the power level of a transmission of the link according to said received indicator;

means for measuring, at a second station, a signal to noise ratio of a transmission from the first station;

means for determining, at the second station, an expected signal to noise ratio of the transmission;

means for determining the indicator in accordance with said measured signal to noise ratio and the expected signal to noise ratio;

a transmitter configured to transmit, from the second station, the indicator; and means for setting an initial expected signal to noise ratio equal to the signal to noise ratio of a first successfully decoded transmission.

9. A method for determining signal to noise ratio of transmissions received within a communication system including a communication channel and a pilot channel, comprising:

measuring a signal to interference ratio of the transmissions over a first time interval;

measuring a noise to interference ratio of the transmissions over a second time interval; and dividing the measured signal to interference ratio by the measured noise to interference ratio.

10. The method as claimed in claim 9, wherein said measuring a signal to interference ratio of the transmissions over a first time interval comprises:

measuring a signal to interference ratio over one frame.

11. The method as claimed in claim 9, wherein said measuring a signal to interference ratio of the transmissions over a first time interval comprises:

measuring a signal to interference ratio over a time interval comprising that portion of a frame where a ratio of a pilot signal transmission gain to a communication channel signal transmission gain is constant.

12. The method as claimed in claim 9, wherein said measuring a signal to interference ratio of the transmissions over a first time interval comprises:

determining a signal to interference ratio scaled by a first factor; and eliminating the first factor.

13. The method as claimed in claim 12, wherein said determining a signal to interference ratio scaled by a first factor comprises:

decoding the signal received over the communication channel to obtain data;

encoding the data to obtain symbols; and computing a first dot product between said signal received over the communication channel and the symbols.

14. The method as claimed in claim 13, wherein said eliminating the first factor comprises:

computing a second dot product of a signal received over the pilot channel; and dividing the first dot product by the second dot product.

15. The method as claimed in claim 9, wherein said measuring a noise to interference ratio of the transmissions over a second time interval comprises:

differentiating a signal received over the pilot channel.

16. The method as claimed in claim 15, wherein said differentiating a signal received over the pilot channel comprises:

inverting the signal received over the pilot channel;

shifting said inverted signal; and summing the signal received over the pilot channel with said shifted signal.

17. The method as claimed in claim 15, wherein said differentiating a signal received over the pilot channel comprises:

decovering a signal received over the pilot channel; and integrating said decovered signal over the second predetermined amount of time.

18. The method as claimed in claim 9, further comprising:

dividing the signal to noise ratio by a number of symbols in the first predetermined amount of time.

19. An apparatus for determining signal to noise ratio of transmissions received within a communication system including a communication channel and a pilot channel, comprising:

means for measuring a signal to interference ratio of the transmissions over a first time interval;

means for measuring a noise to interference ratio of the transmissions over a second time interval; and means for dividing the measured signal to interference ratio by the measured noise to interference ratio.

20. The apparatus as claimed in claim 19, wherein said means for measuring a signal to interference ratio of the transmissions over a first time interval comprises:

means for measuring a signal to interference ratio over one frame.

21. The apparatus as claimed in claim 19, wherein said means for measuring a signal to interference ratio of the transmissions over a first time interval comprises:

means for measuring a signal to interference ratio over a time interval comprising that portion of a frame where a ratio of a pilot signal transmission gain to a communication channel signal transmission gain is constant.

22. The apparatus as claimed in claim 19, wherein said means for measuring the signal to interference ratio over predetermined period of time comprises:

means for determining a signal to interference ratio scaled by a first factor; and means for eliminating the first factor.

23. The apparatus as claimed in claim 22, wherein said means for determining a signal to interference ratio scaled by a first factor comprises:

a receiver for receiving a signal over a communication link;

a decoder, communicatively coupled to said receiver, configured to decode said signal received over the communication channel to obtain data;

encoder, communicatively coupled to said decoder, configured to encode the data to obtain symbols; and a processor, communicatively coupled to said encoder and said receiver, configured to compute a first dot product between the signal received over the communication channel and the symbols.

24. The apparatus as claimed in claim 22, wherein said means for eliminating the first factor comprises:

a receiver for receiving signal over a communication link;

a processor, communicatively coupled to said receiver, configured to:

compute a second dot product of the signal received over the pilot channel; and divide the first dot product by the second dot product.

25. The apparatus as claimed in claim 24, wherein said means for differentiating a signal received over the pilot channel comprises:

means for inverting the signal received over the pilot channel;

means for shifting said inverted signal; and means for summing the signal received over the pilot channel with said shifted signal.

26. The apparatus as claimed in claim 19, wherein said measuring a noise to interference ratio of the transmissions over a second time interval comprises:

means for differentiating a signal received over the pilot channel.

27. The apparatus as claimed in claim 26, wherein said means for differentiating a signal received over the pilot channel comprises:

means for decovering a signal received over the pilot channel; and means for integrating said decovered signal over the second predetermined amount of time.

28. The apparatus as claimed in claim 19, further comprising:

means for dividing the signal to noise ratio by a number of symbols in the first predetermined amount of time.

29. A method for determining an indicator, comprising:

measuring a signal to noise ratio of a link;

determining an expected signal to noise ratio of the link; and determining the indicator in accordance with said measured signal to noise ratio and the expected signal to noise ratio, wherein said measuring a signal to noise ratio of a link comprises:

measuring a signal to interference ratio of the link over a first time interval;

measuring a noise to interference ratio of the link over a second time interval; and dividing the measured signal to interference ratio by the measured noise to interference ratio.

30. A method for determining an indicator, comprising:

measuring a signal to noise ratio of a link;

determining an expected signal to noise ratio of the link; and determining the indicator in accordance with said measured signal to noise ratio and the expected signal to noise ratio, wherein said determining an expected signal to noise ratio of the link comprises:

decoding a frame of a signal received over the link; and decreasing a previously determined expected signal to noise ratio by a first value when said decoding is successful;

increasing the previously determined expected signal to noise ratio by a first value when said decoding is unsuccessful.

31. A method for determining an indicator, comprising:

measuring a signal to noise ratio of a link;

determining an expected signal to noise ratio of the link; and determining the indicator in accordance with said measured signal to noise ratio and the expected signal to noise ratio, further comprising:

setting an initial expected signal to noise ratio equal to the signal to noise ratio of a first successfully decoded frame of received signal.

32. An apparatus for determining an indicator, comprising:

means for measuring a signal to noise ratio of a link;

means for determining an expected signal to noise ratio of the link; and means for determining the indicator in accordance with said measured signal to noise ratio and said expected signal to noise ratio, wherein said measuring a signal to noise ratio of a link comprises:

means for measuring a signal to interference ratio of the link over a first time interval;

means for measuring a noise to interference ratio of the link over a second time interval; and means for dividing the measured signal to interference ratio by the measured noise to interference ratio.

33. An apparatus for determining an indicator, comprising:

means for measuring a signal to noise ratio of a link;

means for determining an expected signal to noise ratio of the link;

means for determining the indicator in accordance with said measured signal to noise ratio and said expected signal to noise ratio, wherein said means for determining an expected signal to noise ratio of the link comprises:

a decoder configured to decode a frame of a signal received over the link; and means for decreasing a previously determined expected signal to noise ratio by a first value when said decoding is successful; and means for increasing the previously determined expected signal to noise ratio by a first value when said decoding is unsuccessful.

34. An apparatus for determining an indicator, comprising:

means for measuring a signal to noise ratio of a link;

means for determining an expected signal to noise ratio of the link; and means for determining the indicator in accordance with said measured signal to noise ratio and said expected signal to noise ratio; and means for setting an initial expected signal to noise ratio equal to the signal to noise ratio of a first successfully decoded frame of the signal.

35. A computer-readable medium storing codes for performing a method for determining signal to noise ratio transmissions received within a communication system including a communication channel and a pilot channel, the method comprising the steps of:

measuring a signal to interference ratio of the transmissions over a first time interval;

measuring a noise to interference ratio of the transmissions over a second time interval; and dividing the measured signal to interference ratio by the measured noise to interference ratio.

* * * * *